3,057,018
ONE-STEP MOLDING OF A DECORATED THERMOSETTING RESIN ARTICLE

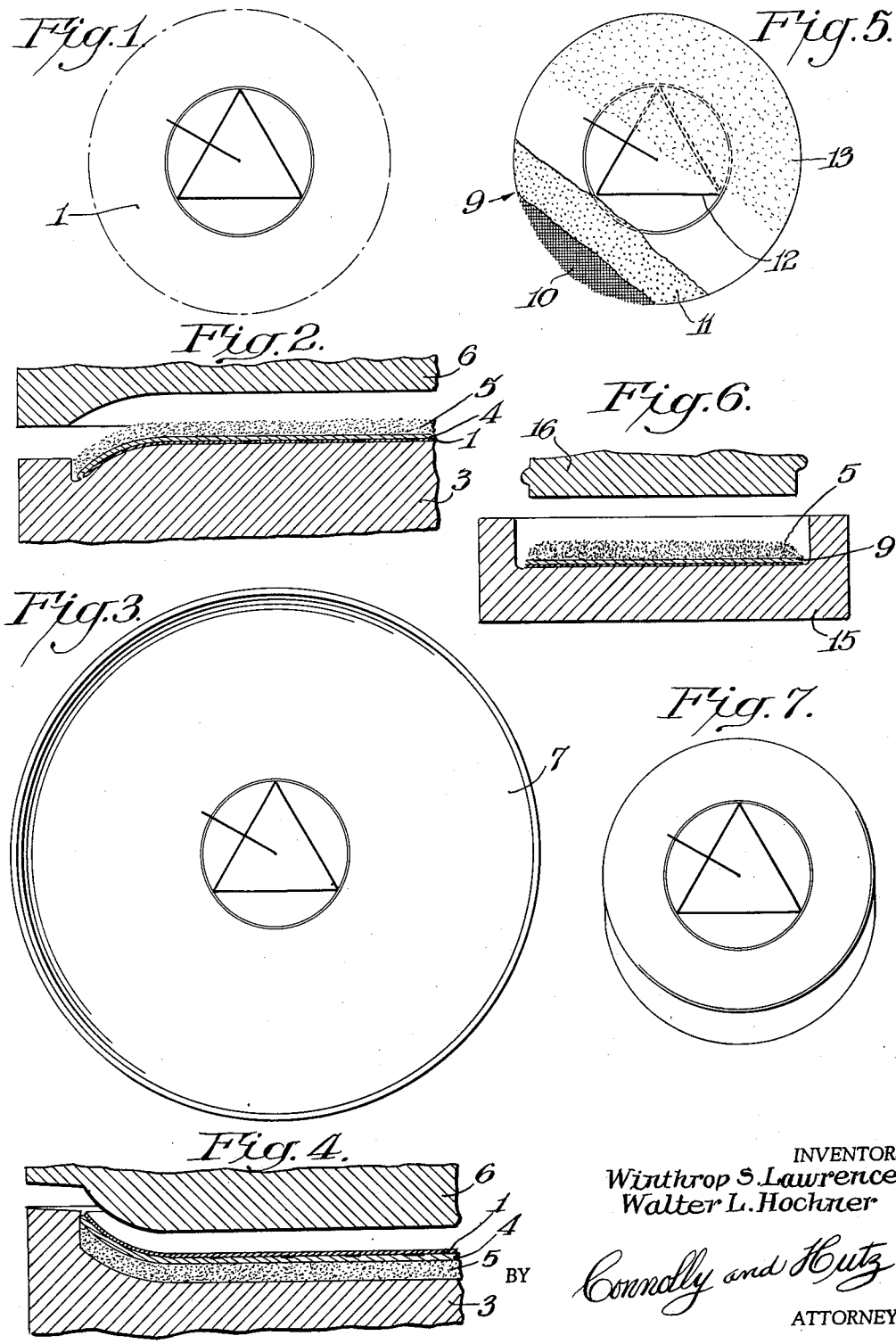

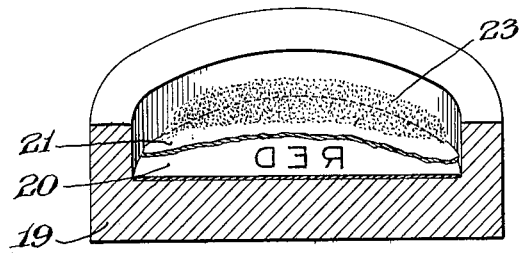
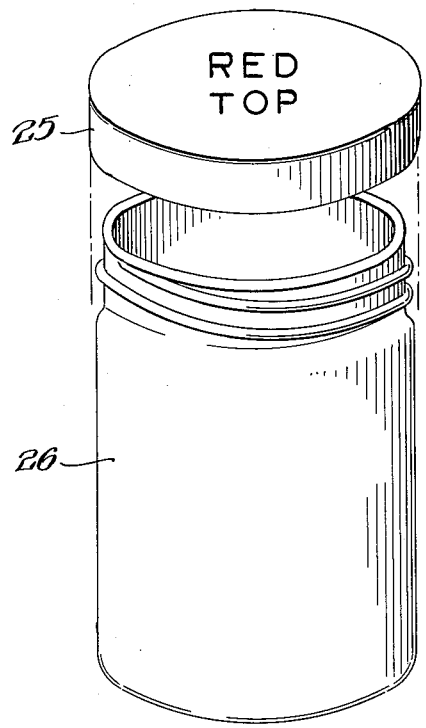

Winthrop S. Lawrence, Landenberg, Pa., and Walter L. Hochner, Wilmington, Del., assignors to Kaumagraph Company, Wilmington, Del., a corporation of Delaware
Filed Feb. 16, 1959, Ser. No. 793,615
9 Claims. (Cl. 18—59)

This invention is directed to a simplified process of overlay printing for use in compression molding. More specifically, the invention is an improvement in a process of applying a decorative surface to a plastic article in the course of molding it from a thermosetting synthetic resin.

In recent years, a considerable market has developed for plastic dishes of the melamine-formaldehyde type because they are unbreakable. Such resins are prepared by heating a solution of melamine (1,3,5-triamino-triazine) and formaldehyde, preferably in the presence of an alkaline curing catalyst, whereby condensation or polymerization results, with evolution of water. When this process is conducted in a mold, one can prepare a variety of plastic products.

A long-recognized difficulty in the plastic article field has involved the inability to apply a good decorative design to the plastic. The general process disclosed in the prior art for affixing a decorative design to plastic dinnerware of this type is illustrated in United States Patents Nos. 2,646,380, 2,760,899, and 2,797,180. This is essentially a two-step molding process. In the first step, a charge of, e.g., melamine-formaldehyde molding powder is placed in the lower half of a mold corresponding in size and shape to that of the article to be formed, and the upper half of the mold is then lowered sufficiently to close the mold. Sufficient heat and pressure are applied to powder in this manner to form a partially cured "preform" in about 30 seconds. For the second step, the mold is now opened and a decorated foil is laid over the preform in the mold. This foil is a flat sheet of thin, fibrous material such as paper which is impregnated with a partially cured resin of the same type as that in the preform, e.g., melamine-formaldehyde, and bears the necessary design. The mold is now closed again and sufficient pressure and heat applied to complete molding within about two minutes. During this second step, the resin content of the foil fuses with the partially condensed resin in the preform so as to permanently integrate the printed foil with the surface of the molded article. At the completion of this second step of molding, the mold is opened and the finished product removed. Preferably, the paper is applied with the ornamented face down, and reliance is placed upon the circumstance that the paper becomes almost wholly transparent, hence invisible, during the curing and integration procedure, so that the design is clearly visible through the foil.

The obvious drawback of this process is in the fact that the molding must be interrupted in order to insert the decorated foil in the mold. The loss of time involved is costly when one considers that the operation of such a mold costs about a dollar a minute, and about 15% of this time is wasted when the molding operation is thus interrupted to insert the foil. It is evident that, if the foil could be inserted in the mold at the beginning of the molding operation, it would represent a considerable saving of time and, hence, money.

One obvious modification of this process would be to prepare the molded preforms separately in the shape of the molded article desired so that the decorated foils could be molded to the surface of these without interruption. However, this would require a separate mold and probably a second operator so that it would be no advantage over the present process wherein the preform and the finished article are prepared in series in the same mold.

A second obvious possibility would be to place the decorated foil on top of the molding powder before the mold is first closed instead of inserting it into the mold part-way through the molding operation. However, the conventional rayon foils are badly ruptured in such a process because the coarse granular molding powder pierces and ruptures the foil when the upper half of the mold is pressed down upon the foil and the underlying powder.

Accordingly, the object of the present invention is to provide a practical and commercially operative method of conducting essentially a one-step molding process for the manufacture of a decorated article composed of a thermosetting resin.

The present invention avoids the disadvantages of the conventional two-step molding process by simplifying the molding operation to what is essentially a one-step process, this being achieved by eliminating the conventional first step of forming a shaped preform in the mold before the printed foil is applied thereto. According to the present invention, the printed foil is placed in the mold at the beginning of the molding operation, thereby making it unnecessary to later interrupt the molding process to insert the foil. While the invention will be described mainly in terms of melamine-formaldehyde resins, it should be understood that it is equally applicable to other thermosetting compression-molding resins such as urea or phenol-formaldehyde.

The invention is illustrated by the drawings wherein:

FIGURE 1 is a plan view of a melamine-formaldehyde impregnated foil or wafer of rayon paper which has been printed with an inked design;

FIGURE 2 is a fragmentary sectional view of a mold in which the printed foil of FIGURE 1 is positioned on the surface of the lower half of the mold, covered with a protective foil, and the latter in turn covered with molding powder;

FIGURE 3 is a plan view of the molded article formed in the mold of FIGURE 2;

FIGURE 4 is a fragmentary sectional elevation of the printed foil of FIGURE 1 in a mold wherein it is separated from the overlying molding powder by an intermediate protective foil;

FIGURE 5 illustrates a printed foil which is prepared from a synthetic polymeric fabric such as nylon fabric;

FIGURE 6 illustrates a fragmented section of a mold wherein the printed foil of FIGURE 5 is placed on the surface of the bottom half of the mold and is covered with molding powder;

FIGURE 7 shows a printed jar cap which has been formed in the mold illustrated in FIGURE 6;

FIGURE 8 is a perspective view of a lower mold portion, partly in section, wherein a rayon foil with its printing reversed is placed print side up in the bottom half of a mold, covered with a heavy dec paper, and the latter in turn covered with molding powder; and FIGURE 9 shows a jar cap formed from the mold illustrated in FIGURE 8 and arranged in position to be screwed onto the top of a jar.

It has been discovered that a practical one-step molding operation is possible by the proper use of several factors which are important in molding. The first factor is the support of the foil in the mold, which is directly related to the disposition of powder in respect to the foil. Obviously, if the foil is supported over its entire area by the smooth mold surface, it is less likely to rupture than it is if it is pressed into a layer of granular molding powder. The most successful molding is achieved by placing the foil flat on the bottom of the mold and then covering this with the molding powder before closing the mold. This feature is illustrated in FIGURE 2 wherein a printed rayon foil 1 is laid on the lower half 3 of the mold with its printed side up and reversed and over this is laid a reinforcing foil 4 of heavier construction. Then a layer of powder 5 is spread over this foil 4. The top section 6 of the mold is then closed slowly and the necessary heat and pressure applied to cure the powder and to integrate the foils into the lower surface of the molded article 7, which will have the appearance shown in FIGURE 3.

Alternatively, a printed rayon foil can be laid over the top of the charge of molding powder if similar reinforcement is placed between the foil and the surface of the powder. This is illustrated in FIGURE 4 wherein a charge of molding powder 5 is first placed in the lower half 3 of mold sections 3, 6; a sheet of dec paper 4 (a heavy weight opaque paper) is laid over the top of the charge, and a decorated rayon foil 1 is placed over the dec paper with its printed side down or in. As in FIGURE 3, the resulting molded article 7 will be smooth-surfaced because the dec paper 4 will protect the more fragile rayon foil 1 and both will be fused into the surface of the cured article during molding. Other modifications of these methods will be mentioned later.

A second important factor in one-step molding is the speed of closure of the mold; this determines how fast will be the adjustment of the foil and the powder to final shape. It has been found that a slow closure, and therefore, a slow development of stresses, is very important in producing a satisfactory one-step molding. It is also desirable that molding powder be fine enough not to scratch and fracture the overlay, 20 mesh being about the optimum particle size.

A further factor is the composition of the foil itself. The conventional foils are composed of rayon (regenerated cellulose) or paper (native cellulose) and are prepared by the steps of "web-impregnating" a running length of paper with melamine-formaldehyde, curing, cutting this into sheets, and then printing the design upon the surface of the impregnated sheet. However, as explained above, this foil is too fragile to use without protection in one-step molding and, therefore, it must be protected as stated above in connection with FIGURES 2 and 4 by placing a buffer or shield such as dec paper or an impregnated nylon fabric (woven or non-woven) or similar synthetic fabric between the molding powder and the rayon foil. Of course, the buffer foil must be impregnated in advance with melamine-formaldehyde or whatever thermosetting resin is employed in manufacturing the molded article because in this way the underlay will be physically and chemically fused to the surface of the article during molding.

For certain applications, it is unnecessary to use a rayon foil, but instead, one may employ a synthetic fabric woven from a polyamide such as nylon, a polyester such as Dacron, or a polyacrylonitrile such as Orlon. These have high tensile strength and durability. Non-woven fabric of this type may be used. However, such foils are not transparent and, therefore, cannot be applied to the molded article print side in, as in the case of rayon foils which become transparent during molding. Instead these synthetics must first be impregnated with the melamine-formaldehyde resin, then pritned with the desired design, and the printed surface varnished with a melamine varnish to protect the print. Such a foil is illustrated in FIGURE 5 which shows, in somewhat exaggerated detail, a foil 9 comprising a 70 denier woven or non-woven nylon 10 impregnated with melamine-formaldehyde 11, printed with a design 12, and the latter in turn given a varnish coating 13. The application of this foil to a molded article is illustrated in FIGURE 6 wherein the jar cap of FIGURE 7 is manufactured by first laying the printed synthetic foil 9 of FIGURE 5 print side down on the lower half 15 of the mold and then placing the molding powder 5 upon this before closing the upper mold section 16. The resulting molded article shown in FIGURE 7 is the most practical modification for the one-step molding of articles of this type which are not subjected to too much surface wear and abrasion and are discarded as soon as their contents are used up.

However, the use of these printed synthetic foils would not be feasible in the manufacture of dishes because, in this case, the printed surface is exposed to a succession of physical and chemical forces of attrition. This includes chemical attack by acidic and sulfidic foodstuffs, as well as the cutting action of knives and forks and the abrasive action of dishcloths, abrasive cleaners, dishtowels, etc. Accordingly, the *best* method known for applying a printed surface to melamine dishes is by the use of a rayon foil applied print side down against the powder, and, for one-step molding, protected by an underlay as described above and illustrated in FIGURES 2 and 4.

While a synthetic such as Dacron or nylon could be printed and then impregnated, this involves machinery that would either print in the web or impregnate in sheets, both of which are somewhat costly and objectionable.

Another modification of this one-step molding process involves using a combination of a conventional printed resin-impregnated rayon foil with a synthetic fabric woven or non-woven, type of foil of the type already mentioned but with the printing reversed on the rayon foil. This type of arrangement is illustrated in FIGURE 8 wherein the rayon foil 20 printed in reverse is laid in the bottom half 19 of the mold, print side up. Over this is laid a second foil 21 composed of, say, nylon fabric, which is preferably about 70 denier and is impregnated with about 3 ounces to the yard of catalyzed melamine-formaldehyde and a pigment which will blend with the matching section of the piece being molded. For example, where the molded article is a jar cap 25 (FIGURE 9) which is to be screwed upon a white plastic jar 26, the nylon fabric would be impregnated with a titanium dioxide pigment simultaneously with its impregnation with catalyzed melamine-formaldehyde resin. Then the synthetic fabric is dried at about 105° C. for three minutes, subsequently cured by heating to about 150° C. for three minutes; this sets the resin sufficiently so that it will not be distorted by the molding powder during molding, nor will it rupture the rayon foil.

The rayon foil-synthetic foil combination 20, 21 is then covered with molding powder 23 as shown in FIGURE 8 and the mold closed, after which molding proceeds in the usual way. When the mold is opened and the molded jar cap 25 removed, it will be seen as shown in FIGURE 9 that the reversal of the printing has been rectified due to the fact that the observer views it through the now transparent rayon foil 20, the printing being on the underside of the foil but completely visible from the topside. This modification, of course, is of no particular interest where the design is a flowered or geometrical design but is used where the printed material is of the type which must be read, i.e., composed of letters or numbers.

The following examples illustrate in somewhat greater detail several modifications of the one-step molding process of this invention.

*Example I*

A 70 denier nylon fabric was impregnated with the following solution, the components of which are listed in parts by weight:

Water at 180° F. _____ 610
Cymel 405 (melamine - formaldehyde precondensate) _____ 750
Accelerator (curing catalyst)_____ 45
$TiO_2$ _____ 600
Alcohol _____ 40

The above solution is prepared by first adding the $TiO_2$ to the hot water, stirring in the Cymel 405 until free from lumps, after which the slurry is strained, the dispersion cooled, and the accelerator added. After the nylon is impregnated with this solution and the excess removed, it will be found that the nylon fabric has gained about 2½ ounces of weight per yard or 146%, giving a product having about 60% solids (pigment, resin and accelerator added). After drying and curing at 150° C. for three minutes, there was a loss of 8.8% which brings down the proportion of impregnant to about 56-57% of total weight. It will be seen that the volatile is relatively low, about 2% ±1. The three-minute cure at 150° C. on nylon is entirely satisfactory and is not improved by a five-minute cure.

This nylon fabric overlay was printed, and then varnished with a catalyzed melamine-formaldehyde solution of the following composition:

| | |
|---|---|
| Cymel 405 | 143 |
| Santocel (inorganic siliceous filler) | 37 |
| Water | 17.6 |
| Carboxymethyl cellulose | 8.5 |
| Carbitol (monoethyl ether of diethylene glycol) | 13.5 |
| Accelerator | 4 |

It was then placed ink side down on the bottom of a female mold as in FIGURE 6 and covered with a charge of melamine-formaldehyde molding powder, weight 11 grams, after which a pressure of 500 p.s.i. was applied for 30 seconds to complete molding. Excellent results were obtained with little or no distortion.

In a modification of this process, the impregnated nylon fabric was not printed or varnished, but instead, a printed rayon melamine-formaldehyde-treated foil was placed in the mold ink side up and in as in FIGURE 2 and over this was placed the impregnated nylon foil cut to the same size, say, 2⅝ inches in diameter. The 11 grams of molding powder was poured on this and force applied as above. Excellent results were obtained with high gloss and no distortion or rupture of the printed molded article.

*Example II*

Ten-inch dinner plates were molded by first placing 310 grams of melamine-formaldehyde molding powder free of particles over 20 mesh size in a female mold, smoothing this out to a flat surface, placing a dec foil over the powder, and then placing a foil of resin-impregnated printed rayon foil over this dec paper, ink side down as in FIGURE 4, after which the mold was closed over a period of about 20 seconds and the pressure raised to 100 tons. After degassing at 40 seconds and then molding for 1½ minutes, a good molded plate with no breaks or distortion was obtained with excellent whiteness and good gloss. The rayon foil employed in the above process was a 28-pound rayon impregnated with 67% resin, 7% volatile and 4% ±1 flow, the usual type. The dec paper was impregnated with melamine-formaldehyde resin as well as pigmented with $TiO_2$ and was a 180-pound paper, the type used for printing countertops (Formica).

It is of interest to note that a conventional two-step molding process (first molding a preformed plate, opening the mold and laying the foil on this, and then completing the molding) is inoperative with nylon fabric foil because the print blisters badly in the process.

The specifications for one-step molding will, of course, vary in different cases, but in general, the degree of flow during molding determines gloss and adhesion to a very considerable degree, while the resin content of the foil determines the gloss durability and resistance to rupture of the finished molded surface.

The melamine-formaldehyde used in the invention may be the Melmac 405 mentioned above in the specific working example. One may also use in its place Melmac 1077 or 1079, each of which melamine-formaldehyde resin contains alpha cellulose as the filler, has a specific gravity of 1.5 and a tensile strength of 7,000–8,000 lb./sq. in. Also useful in the invention is the alpha cellulose-filled melamine-formaldehyde resin sold by a division of Allied Chemical and Dye Corporation under the trademark "Plaskon." This material also has a specific gravity about 1.5 and a tensile strength of about 10,000 lb./sq. in. As has been indicated above, the accelerator is added to the resin composition just before use. This accelerator is preferably ammonium chloride; however, any of the other accelerators known in the art may be substituted. For example, other ammonium salts which liberate acid may be used; and organic halogen derivatives which liberate hydrogen halide on heating, such as bromohydrosuccinic acid, beta chloro (or beta bromo) ethyl urea may be used as so-called "latent accelerators." Other accelerators such as phosphoric acid esters, organic amides and imides (e.g., benzoic acid amide, N-benzoyl succinamide, N-propionyl-phthalamide, alpha dichlorhydrin, etc.)

The inks used for printing the decoration on the coated, partially impregnated paper are those known to be useful in lithography and fast to heat and formalin vapors, e.g., Pigment Scarlet, Phthalocyamine Blue, Phthalocyamine Green, Carbon Black, Benzidine Yellow, Victoria Blue, Rhoduline Blue, etc. Melamine-formaldehyde (or equivalent) resins may be added, if desired, for improving the adhesive characteristics of the ink.

While the invention has been described in connection with melamine-formaldehyde resins, it is to be understood that it is equally applicable to other thermosetting resins of this type such as urea-formaldehyde and phenol-formaldehyde. The inks used in printing the foils also may be water-base inks of the type described in applicants' co-pending application Serial No. 779,642, now abandoned, the advantage of these over the conventional oil-base inks being that of non-blistering. In this type of ink, the oil base or alkyd resin of the conventional oils is replaced by a water-soluble vehicle, preferably one having a solvent or softening action on the melamine resin in the printed sheet.

We claim:
1. A process for the one-step molding of a decorated plastic article which comprises placing a quantity of thermosetting compression molding powder in a mold with a strong design-bearing fibrous foil in contact with the molding powder, said foil being impregnated, prior to application of the design, with the same resin as that which comprises the molding powder, the printing being applied to the foil surface which is not in direct contact with the molding powder and then closing the mold and subjecting the powder and foil to the heat and pressure required to integrate the foil with the resin powder.

2. A process of claim 1 wherein the thermosetting resin is selected from the group consisting of urea-formaldehyde and melamine-formaldehyde.

3. The process of claim 1 wherein the printed foil is prepared by impregnating the foil with the partially condensed thermosetting resin and then applying the printed design thereto.

4. The process of claim 1 wherein the printed foil is a synthetic resin fabric which has been impregnated with the partially condensed thermosetting resin and then printed with a design.

5. The process of claim 1 wherein the printed foil is a synthetic fabric which has been impregnated with the partially condensed thermosetting resin, printed with a design, and the printed surface varnished with a melamine resin varnish to protect the print.

6. The process of claim 1 wherein the printed foil is a nylon fabric impregnated with melamine-formaldehyde resin prior to applying the design.

7. A process for the one-step molding of a printed plastic article which comprises positioning a printed foil print side down on the bottom half of a mold, said foil being composed of nylon fabric which has been first impregnated with a catalyzed melamine-formaldehyde resin, thermally cured, printed on one side, and then varnished with a second application of melamine-formaldehyde resin; placing a quantity of partially condensed melamine-formaldehyde molding powder upon the upper surface of the nylon foil, and then closing the mold and applying sufficient heat and pressure to shape and cure the contents into a plastic article having the printed foil permanently integrated into one surface thereof.

8. The process of claim 7 wherein the nylon foil is impregnated with a pigment simultaneously with its initial impregnation with melamine-formaldehyde resin.

9. The process of claim 7 wherein the molding time is about 30 seconds at a pressure of 500 p.s.i.

References Cited in the file of this patent

UNITED STATES PATENTS

| | | |
|---|---|---|
| 2,410,361 | Prance | Oct. 29, 1946 |
| 2,417,510 | McGinnis | Mar. 18, 1947 |
| 2,760,899 | Cameron et al. | Aug. 28, 1956 |
| 2,833,685 | Lawrence | May 6, 1958 |

FOREIGN PATENTS

| | | |
|---|---|---|
| 739,801 | Great Britain | Nov. 2, 1955 |